(12) United States Patent
Cogswell

(10) Patent No.: US 10,647,017 B2
(45) Date of Patent: May 12, 2020

(54) FLUID-DRIVEN RING SAW

(71) Applicant: GEMINI SAW COMPANY, INC., Torrance, CA (US)

(72) Inventor: Jesse G. Cogswell, Torrance, CA (US)

(73) Assignee: Gemini Saw Company, Inc., Torrance, CA (US)

( * ) Notice: Subject to any disclaimer, the term of this patent is extended or adjusted under 35 U.S.C. 154(b) by 15 days.

(21) Appl. No.: 15/992,064

(22) Filed: May 29, 2018

(65) Prior Publication Data

US 2018/0370066 A1 Dec. 27, 2018

Related U.S. Application Data

(60) Provisional application No. 62/511,858, filed on May 26, 2017.

(51) Int. Cl.
| | | |
|---|---|---|
| *B27B 5/14* | (2006.01) | |
| *B23D 61/18* | (2006.01) | |
| *B23D 61/02* | (2006.01) | |
| *B23D 47/12* | (2006.01) | |
| *B23D 61/08* | (2006.01) | |

(52) U.S. Cl.
CPC .............. *B27B 5/14* (2013.01); *B23D 47/123* (2013.01); *B23D 61/025* (2013.01); *B23D 61/08* (2013.01); *B23D 61/18* (2013.01)

(58) Field of Classification Search
CPC ...... B23D 61/08; B23D 45/08; B23D 47/123; B27B 5/00; B27B 5/14; B28D 1/121
USPC .......................................................... 125/15
See application file for complete search history.

(56) References Cited

U.S. PATENT DOCUMENTS

| | | | |
|---|---|---|---|
| 2,784,536 A | 3/1957 | Barron | |
| 3,491,742 A | 1/1970 | Weiss | |
| 3,556,074 A | 1/1971 | Nelke | |
| 3,626,921 A | 12/1971 | Lane | |
| 3,640,027 A | 2/1972 | Weiss | |
| 3,957,593 A | 5/1976 | Haack | |

(Continued)

FOREIGN PATENT DOCUMENTS

| | | |
|---|---|---|
| DE | 2121200 | 10/1972 |
| DE | 2558781 | 7/1977 |

(Continued)

OTHER PUBLICATIONS

English Translation RU 2617354. (Year: 2017).*

(Continued)

*Primary Examiner* — Jennifer B Swinney
(74) *Attorney, Agent, or Firm* — Knobbe, Martens, Olson & Bear, LLP

(57) ABSTRACT

A fluid-driven ring saw includes a ring saw blade that is supported and driven by a fluid. The fluid-driven ring saw can include one or more pairs of fluid nozzles. Each pair of fluid nozzles can include a first fluid nozzle separated from a second fluid nozzle by a gap. The ring blade can be positioned within the gap. The ring blade can include a plurality of holes. The one or more pairs of fluid nozzles can deliver fluid jets that impinge upon the plurality of holes of the ring blade to drive rotation of the ring blade. The ring blade can be driven without direct contact of a mechanical linkage, such as a belt or chain. The ring blade can be relatively thinner than ring blades driven by mechanical linkages.

21 Claims, 11 Drawing Sheets

(56) References Cited

U.S. PATENT DOCUMENTS

| | | | |
|---|---|---|---|
| 4,424,649 | A | 1/1984 | Vincent et al. |
| 4,436,078 | A | 3/1984 | Bourke |
| 4,576,139 | A | 3/1986 | Cogswell |
| 4,976,251 | A | 12/1990 | Smith |
| 5,351,444 | A | 10/1994 | Steere, Jr. |
| 5,471,970 | A | 12/1995 | Sakarcan |
| 5,495,844 | A | 3/1996 | Kitajima et al. |
| 5,674,119 | A | 10/1997 | DesRosiers |
| 5,951,378 | A | 9/1999 | Miller et al. |
| 5,964,210 | A | 10/1999 | Hodsden |
| 6,003,422 | A * | 12/1999 | Holston ............... B23D 61/121 83/661 |
| 6,012,977 | A | 1/2000 | Yoshikawa et al. |
| 6,119,675 | A | 9/2000 | Akram et al. |
| 6,203,416 | B1 | 3/2001 | Mizuno et al. |
| 6,311,684 | B1 | 11/2001 | Hodsden et al. |
| 6,354,909 | B1 | 3/2002 | Boucher et al. |
| 6,632,126 | B1 | 10/2003 | Cogswell |
| 6,945,850 | B2 | 9/2005 | Perrey |
| 7,350,518 | B2 | 4/2008 | Cogswell |
| 2003/0094078 | A1 | 5/2003 | Clanton |
| 2011/0000353 | A1* | 1/2011 | Economaki ............ B23D 49/10 83/648 |
| 2017/0341170 | A1* | 11/2017 | Suleiman ............ B23D 61/025 |

FOREIGN PATENT DOCUMENTS

| | | |
|---|---|---|
| DE | 2711244 | 10/1977 |
| DE | 3807094 | 9/1989 |
| DE | 4301243 | 7/1993 |
| EP | 0807493 | 11/1997 |
| RU | 2536637 C1 * | 12/2014 |
| RU | 2572191 C1 * | 12/2015 |
| RU | 2617354 C1 * | 4/2017 |
| SU | 614941 A1 * | 7/1978 |
| WO | WO 91/02626 | 3/1991 |
| WO | WO 00/43175 | 7/2000 |

OTHER PUBLICATIONS

English Translation of SU614941. (Year: 1978).*

European Search Report for Application No. EP 00 91 1596 dated Jun. 28, 2005 in 4 pages.

International Search Report and Written Opinion for Application No. PCT/US04/01793 dated Aug. 25, 2004 in 7 pages.

International Search Report for Application No. PCT/US00/01374 dated Oct. 2, 2000 in 2 pages.

Supplementary Partial European Search Report for Application No. EP 04704442, dated Aug. 6, 2010, in 4 pages.

* cited by examiner

FLUID-DRIVEN RING SAW

INCORPORATION BY REFERENCE TO ANY PRIORITY APPLICATIONS

This application claims priority to U.S. Provisional Patent Application No. 62/511,858, filed Mar. 26, 2017. Any and all applications for which a foreign or domestic priority claim is identified in the Application Data Sheet as filed with the present application are hereby incorporated by reference under 37 CFR 1.57.

BACKGROUND

Field

This application relates to cutting tools, such as saws. In particular, this application relates to fluid-driven saws that include a blade, such as a ring blade, that is driven by a fluid.

Description

Cutting tools, such as saws, are used in a wide variety of applications. Both manual saws (e.g., hand saws) and powered saws (e.g., saws driven by electric motors) have been developed. Saws can be configured for cutting various types of materials, such as wood, metal, stone, glass, etc. Some saws are suitable only for cutting material along a straight line, while other saws are capable of cutting curved or complex profiles.

SUMMARY

This application describes various systems, devices, and methods for fluid-driven saws. In many of the examples described herein, the fluid-driven saws are ring saws that include ring saw blades. The saw blades can be driven by a fluid, such as a gas (e.g., air or others), a liquid (e.g., water or others), or a combination thereof. In some embodiments, in addition to being driven by the fluid, the saw blades are also supported by the fluid as will be described in greater detail below.

For example, a fluid-driven ring saw can include one or more pairs of juxtaposed fluid nozzles with a ring saw blade positioned therebetween. The fluid nozzles can be configured to generate fluid jets that are configured to drive the saw blade. In some embodiments, the fluid jets are further configured to support the saw blade. The saw blade can include a plurality of holes or openings formed therethrough. The plurality of holes can be positioned on the saw blade so that the fluid jets act upon the plurality of holes to drive and/or support the saw blade as described in greater detail below.

In some embodiments, the fluid-driven ring saws are configured to drive the ring saw blades without any physical drive linkage, such as a belt or chain, connecting to the saw blades. In some embodiments, the saw blades are very thin. For example, in some embodiments, the saw blades can have a thickness of about 0.002 inches. Such thin saw blades can advantageously be used for performing fine, detailed cuts and can reduce material waste. Further, in some embodiments, use of such thin saw blades is possible because the saw blades are driven by a fluid rather than by a physical drive linkage.

In a first aspect, a fluid-driven ring saw includes one or more pairs of fluid nozzles, wherein each pair of fluid nozzles comprises a first fluid nozzle separated from a second fluid nozzle by a gap, and a ring blade positioned within the gap. The ring blade includes an annular body having an outer edge, an inner edge, a first peripheral side, and a second peripheral side, and a plurality of holes positioned around the annular body, each hole extending through the annular body from the first peripheral edge and the second peripheral edge. The one or more pairs of fluid nozzles are configured to deliver fluid jets that apply forces to surfaces of the plurality of holes of the ring blade to drive rotation of the ring blade. A method of using the foregoing system is included; the method of use can include using or assembling any one or more of the foregoing features to achieve functions and/or features of the system as discussed in this disclosure. A method of manufacturing the foregoing system is included; the method of manufacture can include providing, making, connecting, assembling, and/or installing any one or more of the foregoing features of the system to achieve functions and/or features of the system as discussed in this disclosure.

In some embodiments, the fluid-driven ring saw does not comprise a mechanical linkage for driving rotation of the ring blade. In some embodiments, the fluid jets delivered by the one or more pairs of fluid nozzles are further configured to support the ring blade during rotation of the ring blade such that the ring blade does not physically contact any component of the fluid-driven ring saw during rotation. In some embodiments, for each of the one or more pairs of fluid nozzles, the first fluid nozzle and the second fluid nozzles are juxtaposed such that a fluid jet delivered by the first fluid nozzle applies forces on the plurality of holes of the ring saw from the first peripheral side and a fluid jet delivered by the second fluid nozzle applies forces the plurality of holes of the ring saw from the second peripheral side. In some embodiments, for each of the one or more pairs of fluid nozzles: the first fluid nozzle comprises a first exit orifice; the second fluid nozzle comprises a second exit orifice; and the first and second exit orifices are aligned in a direction parallel to an axis of rotation of the ring blade. In some embodiments, for each of the one or more pairs of fluid nozzles, the first and second fluid nozzles are positioned at an angle along a direction of rotation of the ring blade relative to a plane of the ring blade, the plane substantially perpendicular to the axis of rotation of the ring blade. In some embodiments, the angle is about 45 degrees. In some embodiments, for each of the one or more pairs of fluid nozzles, the first and second fluid nozzles are configured to direct fluid to provide substantially equal forces against the surfaces of the plurality of holes along an axis substantially perpendicular to the axis of rotation of the ring blade. In some embodiments, a thickness of the ring blade is less than 0.02 inches. In some embodiments, a thickness of the ring blade is about 0.002 inches. In some embodiments, the fluid or fluid jets comprise(s) air. In some embodiments, the one or more pairs of fluid nozzles are formed in a housing, and wherein the housing further comprises a fluid inlet and a fluid channel extending between the fluid inlet and the one or more pairs of fluid nozzles. A method of using the foregoing system is included; the method of use can include using or assembling any one or more of the foregoing features to achieve functions and/or features of the system as discussed in this disclosure. A method of manufacturing the foregoing system is included; the method of manufacture can include providing, making, connecting, assembling, and/or installing any one or more of the foregoing features of the system to achieve functions and/or features of the system as discussed in this disclosure.

In another aspect, a saw blade that is configured to be driven by a fluid, includes a body, such as a circular or annular body, having an outer edge, an inner edge, a first peripheral side, and a second peripheral side, wherein a thickness of the saw blade, measured between the first peripheral side and the second peripheral side, is less than 0.02 inches, and a plurality of cutouts positioned around the body, each cutout extending through the body from the first peripheral edge and the second peripheral edge. A method of using the foregoing system is included; the method of use can include using or assembling any one or more of the foregoing features to achieve functions and/or features of the system as discussed in this disclosure. A method of manufacturing the foregoing system is included; the method of manufacture can include providing, making, connecting, assembling, and/or installing any one or more of the foregoing features of the system to achieve functions and/or features of the system as discussed in this disclosure.

In some embodiments, the thickness is less than 0.01 inches. In some embodiments, the thickness is less than 0.005 inches. In some embodiments, each of the cutouts comprise a uniform diameter. In some embodiments, the plurality of cutouts comprise a plurality of groups, and wherein each group comprises four cutouts that decrease in diameter from a first cutout of the group to a fourth cutout of the group, and wherein the groups repeat around the body. In some embodiments, the saw blade is configured to be driven by a fluid without being contacted by a mechanical drive linkage. A method of using the foregoing system is included; the method of use can include using or assembling any one or more of the foregoing features to achieve functions and/or features of the system as discussed in this disclosure. A method of manufacturing the foregoing system is included; the method of manufacture can include providing, making, connecting, assembling, and/or installing any one or more of the foregoing features of the system to achieve functions and/or features of the system as discussed in this disclosure.

In another aspect, a method for driving rotation of a blade of a saw includes directing fluid jets into openings on the blade of the saw to support and drive rotation of the blade without the use of a direct mechanical linkage connecting to the blade.

In some embodiments, the method further includes directing the fluid jets at angle relative to a direction of rotation of the blade to drive rotation of the blade. In some embodiments, the method further includes directing the fluid jets to provide substantially equal forces on the openings substantially perpendicular to an axis of rotation of the blade in order to support the blade.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DETAILED DESCRIPTION

Figure 1A:
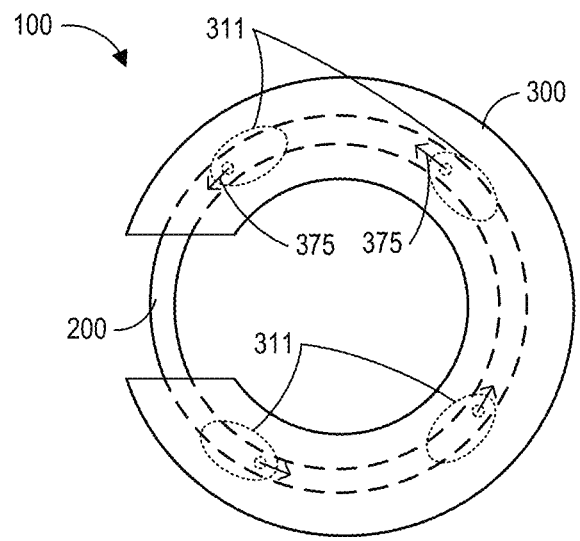
FIG. 1A illustrates an embodiment of a fluid-driven ring saw.

Ring saws, which include an annular, ring-shaped blade having an open center portion, have been developed for cutting very hard materials such as glass, tile, stone and the like, and are popular with stained glass and other types of artists, tile setters, and lapidary enthusiasts all over the world. An advantage of many of these ring saws is that the blade is capable of cutting in all directions, permitting the saws to be used to cut out intricate shapes and complex profiles. Generally, the blades of these ring saws are driven with mechanical linkages, such as cogged belts that are wound around a series of pulleys and powered by electric motors. Examples of such ring saws are described, for example, in U.S. patent application Ser. No. 09/913,214, filed Jan. 10, 2000, which issued as U.S. Pat. No. 6,632,126, on Oct. 14, 2003, and which is incorporated herein by reference. Examples of ring saw blades are described, for example, in U.S. patent application Ser. No. 10/543,196, filed Jun. 19, 2006, which issued as U.S. Pat. No. 7,350,518, on Oct. 14, 2003, and which is also incorporated herein by reference.

While these ring saws have been popular and effective, one disadvantage associated with these ring saws is that the blades have been found to be too thick for use in certain circumstances. For example, the blades of such saws may be too thick to be used on valuable materials or to cut especially small or intricate profiles. At present, the thinnest blades that can be used with such belt-driven saws are about 0.02 inches thick. Efforts to reduce the thickness of the blades have proven ineffective, as thinner blades are unable to withstand the mechanical forces and pressures applied to them by the mechanical linkages (e.g., the belts) that drive them. For example, with belt-driven saws, ring blades less than 0.02 inches thick frequently bend or otherwise deform under the driving forces applied by the belt.

This application describes novel ring saws and assemblies that include fluid-driven ring saw blades. In some embodiments, the fluid-driven ring saws do not include mechanical driving linkages for driving the saw blades. For example, in some embodiments, the blade of a fluid-driven ring saw is essentially free floating, and is contacted and supported substantially only by the fluid that is used to drive its rotation. By eliminating the mechanical driving linkages, the fluid-driven ring saws described herein minimize, reduce, or substantially eliminate the mechanical forces and pressures imparted on the saw blade by the mechanical driving linkages in the ring saws described above, allowing the fluid-driven ring saws to use ring saw blades that are thinner than can be used with belt-driven ring saws.

Various systems, devices, and methods for fluid-driven saws are described below. In many of the examples described herein and illustrated in the figures, the fluid-driven saws are ring saws. The fluid-driven saws described herein may be configured for cutting materials such as glass, tile, stone, or other materials. In some embodiments, the fluid-driven saws are suitable for cutting intricate or complicated shapes. As will be described in greater detail below, the saw blade can be driven by a fluid, such as a gas or a liquid. In some embodiments, in addition to being driven by the fluid, the saw blades are also supported by the fluid. In some embodiments, the fluid-driven saws are configured to drive the saw blades without any physical drive linkage, such as a belt or chain, connecting to the saw blades, which can allow the saw blades to be very thin. Such thin saw blades can advantageously be used for performing fine, detailed cuts and can reduce material waste.

Below, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

FIG. 1A illustrates an embodiment of a fluid-driven ring saw 100. In this example, the fluid-driven ring saw 100 includes a ring saw blade 200 and a housing 300. Example blades 200 are illustrated in greater detail in FIGS. 2A-2C, and example housings 300, 400 are illustrated in greater detail in FIGS. 3A-4E.

A portion of the ring saw blade 200 (illustrated with dashed lines) is positioned within the housing 300, leaving an exposed portion of the blade 200 available for cutting. Within the housing 300, the fluid-driven ring saw 100 includes fluid nozzles 311 configured to deliver fluid jets that support and drive (cause rotation of) the blade 200. In the illustrated example, the blade 200 is configured to rotate in a direction of rotation 375. The fluid can be a gas (such as air or others) or a liquid (such as water or others). In some embodiments, combinations of liquids and gases can be used. In some embodiments, in addition to supporting and driving the blade 200, the fluid can also facilitate the cut such that the fluid-driven saw 100 is a wet saw. The fluid nozzles 311 can be arranged in angled, juxtaposed pairs with the blade 200 positioned therebetween as described in greater detail below (see FIG. 3E). The fluid jets can support and drive the blade 200 without the use of a mechanical linkage such as a belt or chain to directly drive the blade. This can allow relatively very thin blades 200 to be used with the fluid-driven ring saw.

Figure 1B:
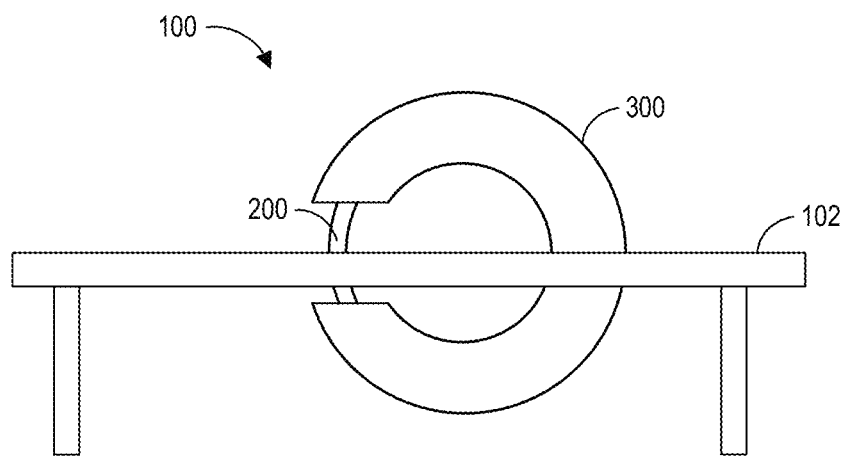
FIG. 1B illustrates an embodiment of the fluid-driven ring saw of FIG. 1A that includes a work surface.
Figure 1C:
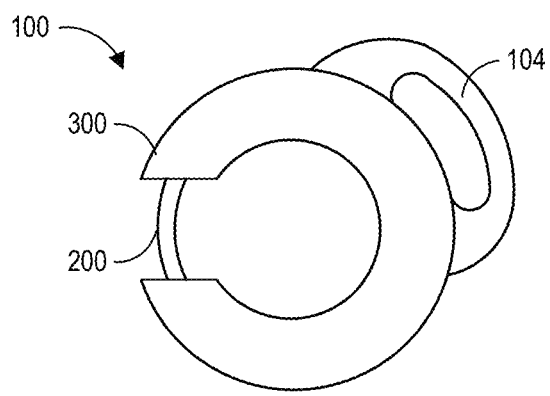
FIG. 1C illustrates an embodiment of the fluid-driven ring saw of FIG. 1A that includes a handle.

FIG. 1B illustrates an embodiment of the fluid-driven ring saw 100 that includes a work surface 102. This can provide a planar surface on which a user can position material to be cut, such as tile or glass. FIG. 1C illustrates an embodiment of the fluid-driven ring saw of 100 that includes a handle 104. Inclusion of the handle 104 may allow the fluid-driven saw to be hand held.

Figure 2A:
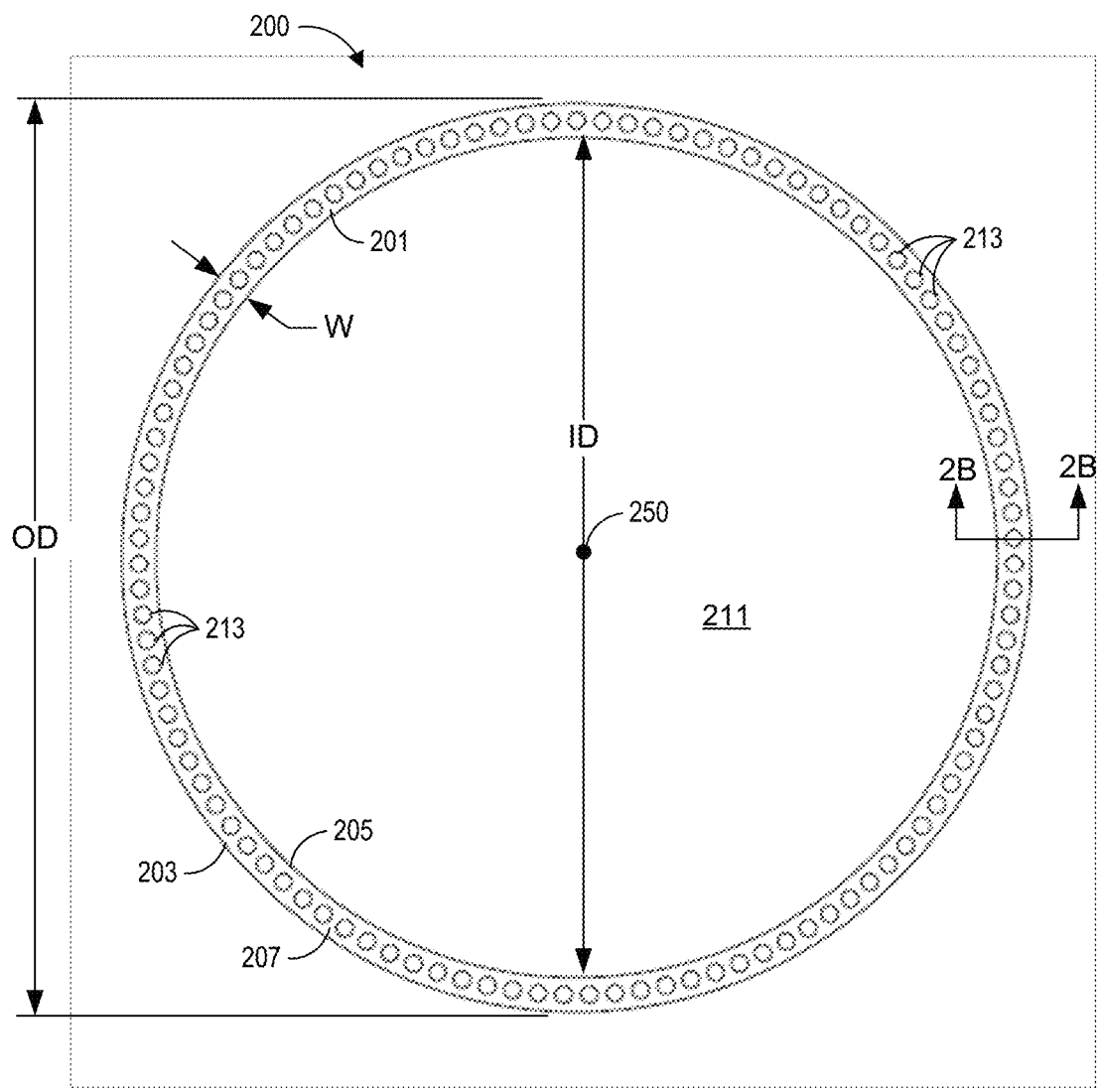
FIG. 2A is a side view of an embodiment of a ring saw blade that is configured to be driven by a fluid.
Figure 2B:
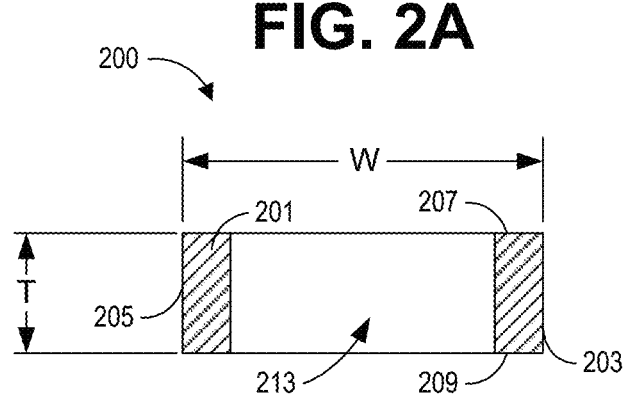
FIG. 2B is a cross-sectional view of the ring saw blade of FIG. 2A.

FIG. 2A is a side view of an embodiment of the ring saw blade 200 (also referred to as the blade 200), and FIG. 2B is a cross-sectional view of the blade 200 taken along the line illustrated in FIG. 2A. The blade 200 is configured to be driven by a fluid, such as a gas (e.g., air or others) or a liquid (e.g., water or others) in a fluid-driven ring saw, such as the ring saw 100 described above with reference to FIGS. 1A-1C. In some embodiments, the blade 200 may be considered a "floating" blade because there is no intended mechanical linkage by which it is to be driven and/or supported; rather, the blade 200 is driven by contact with a fluid, and in some embodiments only by contact with the fluid. In some embodiments, the blade 200 can suitable for cutting curves in both hard and soft materials.

As illustrated in FIG. 2A, the ring saw blade 200 includes an annular, circular, or ring-shaped body 201 having an open center portion 211. The body 201 (such as an annular or circular body having an opening in the center) comprises an outer edge 203, an inner edge 205, a first peripheral side 207, and a second peripheral side 209 (see FIG. 2B). As illustrated, the outer edge 203 can be opposite the inner edge 205, and the first peripheral side 207 can be opposite the second peripheral side 209. In some embodiments, the blade 200 is configured to cut in all directions. For example, the blade 200 can be configured to cut with each of the outer edge 203, the inner edge 205, the first peripheral side 207, and the second peripheral side 209. In some embodiments, the blade 200 is configured to cut with less than all its sides or in less than all directions. For example, in some embodiments, only the outer edge 203, the first peripheral side 207, and the second peripheral side 209 are configured for cutting. In some embodiments, only a portion of the first peripheral side 207 and/or the second peripheral side 209 are configured for cutting. The blade 200 can be configured to rotate around an axis of rotation 250, which extends into and out of the page in FIG. 2A.

In some embodiments, the body 201 is formed of a metal suitable for cutting tools. For example, the body 201 can be formed of cold rolled stainless steel or a carbon steel alloy. Use of other metals and materials is also possible depending on the intended use for the blade 200.

Additionally, the body 201 may include a coating of abrasive particles, such as diamond particles, cubic boron nitride, or the like. In some embodiments, the abrasive particles are embedded within and through the body 201. In some embodiments, the entire blade 200 can be coated or embedded with the abrasive particles. In some embodiments, only a portion of the blade 200 is coated or embedded with the abrasive particles depending on the intended use of the blade 200. In some instances, the blade 200 can be used to cut both forwards and backwards in hard materials if both edges or all surfaces are coated with abrasive materials.

In some embodiments, the blade 200 can include teeth on the outer edge 203 and/or the inner edge 205. In some embodiments, the teeth are configured for cutting soft materials. In some embodiments, the blade 200 can cut forwards and backwards in soft materials when made with cutting teeth.

The outer edge 203 can be defined by an outer diameter OD of the blade 200. In some embodiments, the outer diameter OD of the blade 200 can be any size as desired, and may be limited only by the ability of a manufacturer to produce it. In some embodiments, the outer diameter OD is chosen to adapt the blade 200 to a specific purpose. For example, for use in a fluid-driven ring saw for cutting tile or glass, the outer diameter may be about 2 inches, about 4 inches, about 6 inches, about 8 inches, or about 10 inches, as well as values both above, below, and between the any of the listed values. In some embodiment, the outer diameter OD of the blade is about 4.15 inches. In some embodiments, the outer diameter OD of the blade 200 is about 20 feet. In some embodiments, the outer diameter OD of the blade 200 is about 0.01 inches. Accordingly, in some embodiments, the outer diameter OD may range from 0.01 inches to 20 feet, including 1 inch to 15 feet, including 1 foot to 10 feet, and including the foregoing values and ranges bordering therein.

The inner edge 205 can be defined by an inner diameter ID of the blade 200. In some embodiments, the inner diameter ID is nearly as large as the outer diameter OD of the blade 200, such that the outer edge 203 and the inner edge 205 are separated by a relatively small radial distance represented in the figures as a width W of the blade 200. This gives the blade 200 its annular or ring-like shape and creates the open center portion 211 of the blade 200. In some embodiments, the inner diameter ID is about 80%, about 85%, about 90%, about 92%, about 94%, about 95%, about 96%, about 98%, about 99%, or more than 99% of the outer diameter OD, including about 80 to about 99%, about 85 to about 99%, about 90 to about 99%, about 92 to about 99%, about 94 to about 99%, about 95 to about 99%, about 96 to about 99%, including the foregoing values and ranges bordering therein. In some embodiments, the width W of the blade 200 is about 1 inch, about 0.5 inches, about 0.4 inches, about 0.3 inches, about 0.2 inches, or about 0.1 inches, including any ranges between the foregoing values. In some embodiments, the inner diameter ID of the blade 200 is about 3.85 inches and the width W is about 0.3 inches.

As shown in FIG. 2B, the blade 200 comprises a thickness T measured between the first peripheral side 207 and the second peripheral side 209. As mentioned above, in some embodiments, the thickness T of the blade 200 can be thinner than the thickness of other blades used on mechanically-driven (e.g., belt- or chain-driven) ring saws. This may be because the blade 200 is configured to be fluid-driven, and thus may not be subject to the same mechanical forces and pressures exerted by mechanically-driven ring saws. Accordingly, in some embodiments, the thickness T of the blade 200 can be about or less than 0.2 inches, about or less than 0.15 inches, about or less than 0.1 inches, about or less than 0.08 inches, about or less than 0.06 inches, about or less than 0.05 inches, about or less than 0.04 inches, about or less than 0.03 inches, or about or less than 0.02 inches. Minimal thickness T for the blade 200 may be limited only by current manufacturers' abilities to produce such a blade. In some embodiments, the approximate thickness T is as small as 0.0005 inches. In some embodiments, the minimal thickness T can be as small as 1 angstrom. Accordingly, the thickness T of the blade 200 can be about 0.2 inches to about 1 angstrom, about 0.15 inches to about 1 angstrom, about 0.1 inches to about 1 angstrom, about 0.08 inches to about 1 angstrom, about 0.06 inches to about 1 angstrom, about 0.05 inches to about 1 angstrom, about 0.04 inches to about 1 angstrom, about 0.03 inches to about 1 angstrom, about 0.02 inches to about 1 angstrom, or about 0.0005 inches to about 1 angstrom, including the foregoing values and ranges bordering therein.

These thicknesses T would generally not be possible for ring saw blades used in mechanically-driven ring saws because the mechanical driving linkages in these ring saws would cause the ring saw blades to bend and deform during use. However, because the blade 200 is configured to be driven by a fluid in a fluid-driven ring saw, the blade 200 may be made and used with the dimensions described above.

Further, there can be several advantages associated with the use of a blade 200 having a thickness T as described above. For example, such a thin blade 200 may be suitable for cutting particularly small and complex profiles. As another example, such a thin blade 200 may reduce material waste as it reduces the kerf of the blade 200. This may make the blade 200 desirable for use with valuable and expensive materials.

In some embodiments, the thicknesses T listed above describe the thickness of the blade 200 prior to application of the abrasive coating. In other embodiments, the thicknesses T listed above describe the thickness of the blade 200 after application of the abrasive coating. In one embodiment, the thickness T is 0.002 inches unplated with abrasive. This thickness can be 0.002+/−0.0019 inches, 0.002+/−0.001 inches, including 0.002+/−0.0005 inches, including the foregoing values and ranges bordering therein. In one embodiment, the thickness T can be 0.003 inches including the abrasive coating (such as a diamond coating). This thickness with the abrasive coating can be 0.002+/−0.0019 inches, including 0.003+/−0.001 inches, and including 0.003+/−0.0005 inches, including the foregoing values and ranges bordering therein.

As shown in FIG. 2A, the blade 200 also includes a plurality of holes, openings, cutouts, aperture, or cavity 213. The holes 213 are configured to be acted upon by fluid jets of the fluid-driven ring saw 100 to drive and support the blade 200. For example, in some embodiments, the interaction between the fluid jets and the plurality of holes suspend the blade 200 in midair while at the same time cause the blade 200 to spin in the desired direction.

The holes 213 can extend through the body 201 between the first peripheral side 207 and the second peripheral side 209 as shown, for example, in FIG. 2B. In some embodiments, the holes 213 are equally spaced and equidistant from the center of the blade 200. In some embodiments, the blade 200 does not include any intended arbor hole. Additional detail for the holes 213 will now be described with respect to the detailed views of two example embodiments in FIGS. 2C and 2D.

Figure 2C:
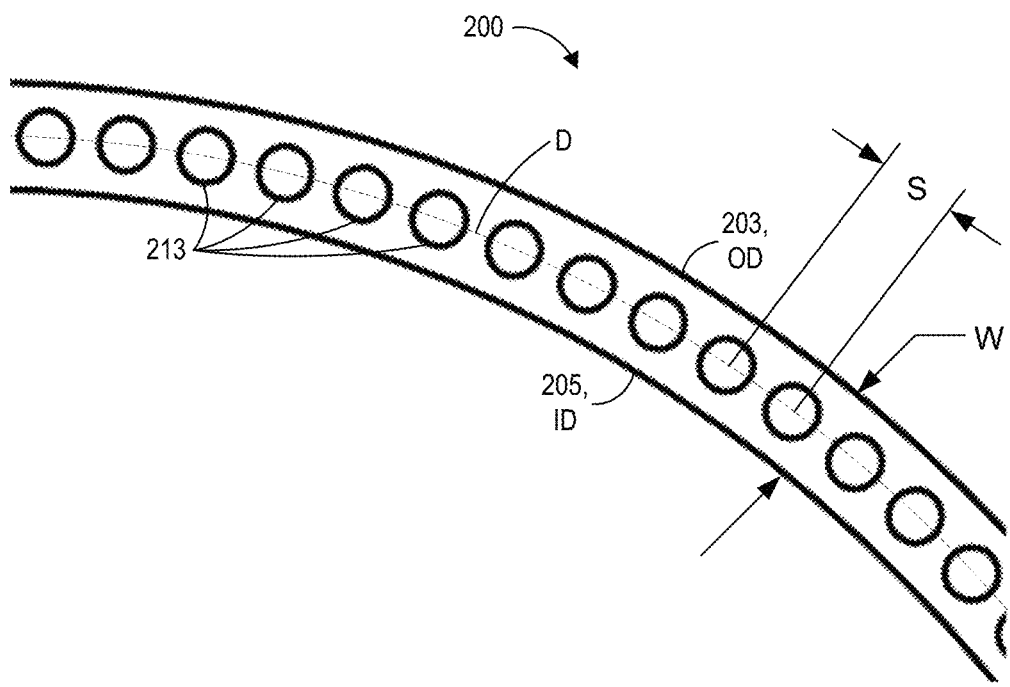
FIG. 2C is a detailed side view of a portion an embodiment of a ring saw blade that includes a plurality of uniform holes formed therein.

FIG. 2C is a detailed side view of a portion an embodiment of the ring saw blade 200. In this embodiment, that blade 200 includes a plurality of uniform holes 213 formed therein. That is, in this embodiment, each of the holes 213 has a diameter that is substantially the same as or equal to the diameter of each of the other holes 213.

In some embodiments, the diameter of the holes 213 can be related to the width W of the blade 200 (i.e., the distance between the outer edge 203 and inner edge 205). For example, in some embodiments, the diameter of the holes 213 is about 40% the width W, about 50% the width W, or about 60% the width W, although other sizes for the diameter of the holes 213, both larger and smaller, are also possible.

In some embodiments, the holes 213 are centered on a diameter D of the blade 200. That is, the holes 213 may be positioned around the body 201 equidistant from a center point of the blade 200. In some embodiments, the diameter D is positioned between the inner diameter ID and the outer diameter OD of the blade 200. In some embodiments, the diameter D is exactly between the inner diameter ID and the outer diameter OD. In some embodiments, the diameter D is not centered between the inner diameter ID and the outer diameter OD. That is, in some embodiments, the holes 213 can be positioned closer to the inner diameter ID or closer to the outer diameter OD.

The holes 213 may be spaced apart along the diameter D. In the illustrated embodiment, the spacing S between the each pair of adjacent holes 213 is constant, although this need not be the case in all embodiments. For example, in some embodiments, the spacing S may be uneven. In some embodiments, the spacing S is related to the width W. For example, the spacing S may be about 80 percent the width W, about 90 percent the width W, about 100 percent the width W, about 110 percent the width W, or about 120 percent the width W, although other spacings S, both larger and smaller are possible. In some embodiments, the spacing S is related to the diameter of the holes 213. For example, the spacing S may be about 110 percent the diameter of the holes 213, about 120 percent the diameter of the holes 213, about 130 percent the diameter of the holes 213, about 140 percent the diameter of the holes 213, or about 150 percent the diameter of the holes 213, although other spacings S, both larger and smaller are possible. In some embodiments, the spacing S may be adjusted to vary the speed at which the blade 200 rotates or other rotational characteristics for the blade 200. In some embodiments, the spacing S is about 0.112 inches, although other spacings are possible, for example, about 0.1 inches, about 0.25 inches, about 0.5 inches, about 0.75 inches, and about 1 inch.

In one embodiment of the blade 200, the outer diameter OD is about 4.156 inches, the inner diameter ID is about 3.844 inches, the diameter D is about 4 inches, and the diameter of each of the holes 213 is about 0.78 inches. Further, in this embodiment, the holes 213 can be evenly spaced such that the blade 200 includes 107 holes 213.

Figure 2D:
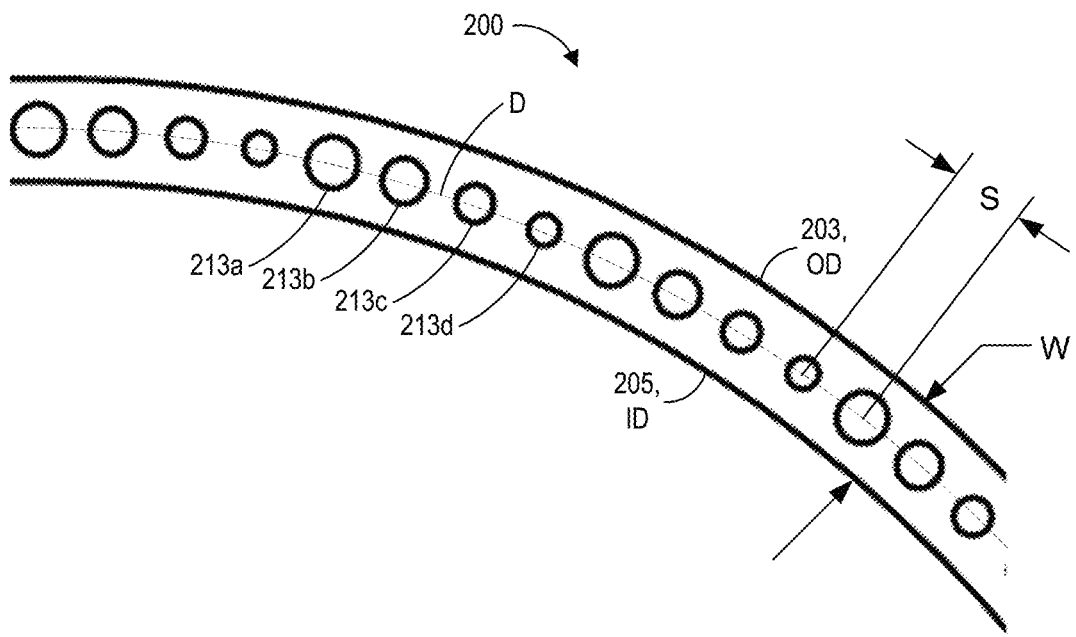
FIG. 2D is a detailed side view of a portion of an embodiment of a ring saw blade that includes a plurality of differently sized holes formed therein.

FIG. 2D is a detailed side view of a portion of an embodiment of a ring saw blade 200 that includes a plurality of differently sized holes 213 formed therein. The embodiment of the blade 200 of FIG. 2D is, in many respect, similar to the embodiment of the blade 200 shown in FIG. 2C, and for ease of description, only certain dissimilar features are described here with the understanding that similar features have been previously described with reference to FIGS. 2A-2C.

In contrast, with the blade 200 of FIG. 2C, the diameters of the holes 213 on the blade 200 of FIG. 2D vary. For example, as illustrated, for each group of four holes 213, the diameter of each successive hole 213 is decreased. In the illustrated embodiment, the diameter of hole 213B is less than the diameter of hole 213A, the diameter of hole 213C is less than the diameter of hole 213B, and the diameter of hole 213D is less than the diameter of hole 213C. This decreasing four hole pattern repeats around the blade 200.

In some embodiments, other patterns of holes 213 of varying diameters and shapes can be used. For example, the diameters of the holes 213 can decrease and then increase for a group. Additionally, a group of holes 213 can contain other numbers of holes 213. For example, the illustrated embodiment includes groups of four holes 213, but other embodiments could include groups of two holes 213, groups of three holes 213, groups of five holes 213, etc.

In some embodiments, by changing the size and/or shape of the holes 213 and/or the spacing S of the holes different cutting qualities for the blade 200 can be produced. For example, the embodiment shown in FIG. 2D may produce a blade 200 with pulsating action. In some embodiments, greater speeds and or pulsating action for the blade 200 can facilitate quicker cutting and/or smoothness of cut. For example, the blade 200 may rotate slower when the fluid contacts the relatively smaller holes 213 and accelerate or increase in speed when the fluid contacts the relatively larger holes 213.

In one embodiment of the blade 200 configured as shown in FIG. 2D, the outer diameter OD is about 4.156 inches, the inner diameter ID is about 3.844 inches, the diameter D is about 4 inches, the diameter of each of the holes 213A is about 0.78 inches, the diameter of each of the holes 213B is about 0.68 inches, the diameter of each of the holes 213C is about 0.58 inches, and the diameter of each of the holes 213D is about 0.48 inches. The diameter of the holes 213 can be scaled according to other dimensions, such as the outer diameter OD and inner diameter ID dimensions discussed herein. Further, in this embodiment, the holes 213 are evenly spaced such that the blade 200 includes 28 holes 213A, 28 holes 213B, 28 holes 213C, and 28 holes 213D.

Other arrangements for the blade 200 and the holes 213 are possible. For example, in the illustrated embodiments, the holes 213 are circular; however, in other embodiments, other shaped holes (e.g., square, arcuate, triangular, slotted, etc.) are possible. Further, in some embodiments, the blade 200 need not be a ring blade. For example, in some embodiments, the blade 200 is a circular saw blade and does not include an open center portion. In some embodiments, some or all of the holes 213 can be replaced with divots or indentations that are similarly configured to engage with fluid streams to drive rotation of the blade.

Figure 3A:
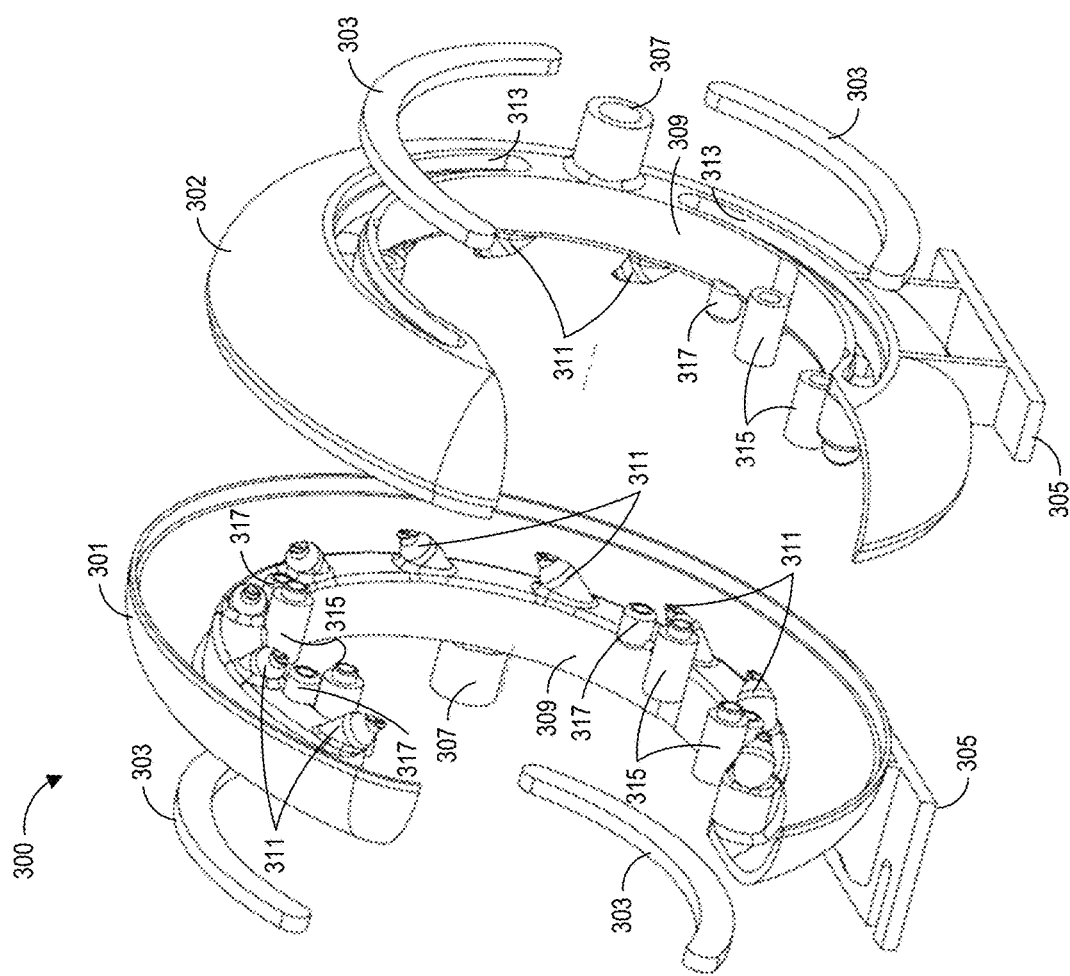
FIG. 3A illustrates an exploded isometric view of an embodiment of a housing for a fluid-driven ring saw.

FIG. 3A illustrates an exploded isometric view of an embodiment of a housing 300 for a fluid-driven ring saw. In the illustrated embodiment, the housing 300 includes a first side portion 301 and a second side portion 302. In the illustrated embodiment, the first and second side portions 301, 302 come together to form the housing 300. In FIG. 3A, the housing 300 is generally C-shaped, although other shapes are possible (see for example, the housing 400 of FIGS. 4A-4E). As illustrated, for some embodiments, each of the first and second side portions 301, 302 include bolt holes 315 that allow the side portions 301, 302 to be joined together with mechanical fasteners such as bolts. Other methods of attaching the side portions 301, 302 together are also possible.

As shown in FIG. 3A, the housing 300 may include a mounting bracket 305. The mounting bracket 305 may have a wide variety of configurations depending on how the fluid-driven saw is to be used or mounted for a particular application.

In the illustrated embodiment, each of the first and second side portions 301, 302 includes a fluid inlet 307. The fluid inlet 307 can be configured as a connector for connecting to a fluid source. As mentioned previously, the fluid can be a gas or a liquid. In some embodiments, the fluid is air. In some embodiments where the fluid is air, the fluid inlet 307 can be a connector configured to connect to a pressurized airline or a compressor. In some embodiments, the fluid can be water. In the illustrated embodiment, each of the first and second side portions 301, 302 includes a fluid inlet 307; however, in other embodiments, the housing 300 may include a single fluid inlet 307 that is configured to connect a fluid source to both of the first and second side portions 301, 302. In some embodiments, the fluid source can be integrated into the housing 300. In some embodiments, the fluid inlet 307 comprises a pipe threaded input. In some embodiments, the pipe threaded input is a $\frac{1}{8}^{th}$ inch pipe thread.

The fluid inlet 307 is connected to one or more fluid channels 309 within each of the first and second side portions 301, 302. The fluid channels 309 deliver fluid from the fluid inlet 307 to a plurality of fluid nozzles 311. The fluid exits the fluid nozzles 311 as fluid jets that support and drive rotation of the blade 200 (see, for example, FIGS. 3C-3E described below).

In the illustrated embodiment, each of the fluid channels 309 includes grooves 313 which are open toward the outer side of each of the first and second side portions 301, 302. Only the grooves 313 of the second side portion 302 are visible in FIG. 3A. The grooves 313 may facilitate manufacturing. For example, the grooves 313 may make the fluid channels 309 easier to form in a molding or 3D printing process. As shown in FIG. 3A, the housing 300 may further comprise plug pieces 303 configured to engage with the open ends of the grooves 313 to seal the fluid channels 309. In some embodiments, the plugs 303 are glued and sealed in place during assembly. The plugs 303 can thus form the outer walls of the fluid channels 309, enclosing the channels 309 such that fluid entering from the fluid inlets is directed to and exits through the fluid nozzles 311. The plugs 303 may friction fit or snap fit into the grooves 313 and/or be sealed with any suitable material.

Figure 3B:
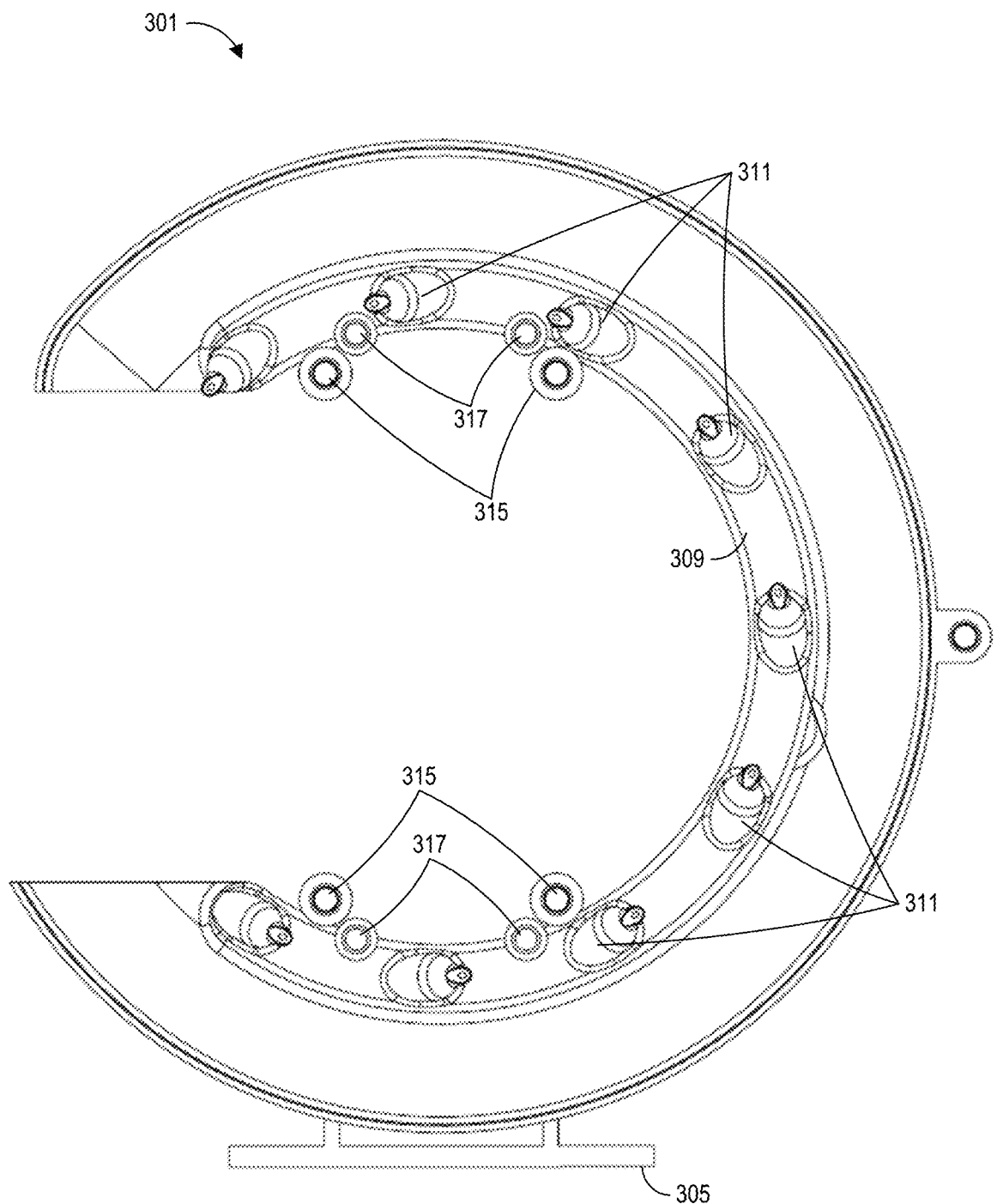
FIG. 3B illustrates an inner side view of a first side portion of the housing of FIG. 3A.
Figure 3D:
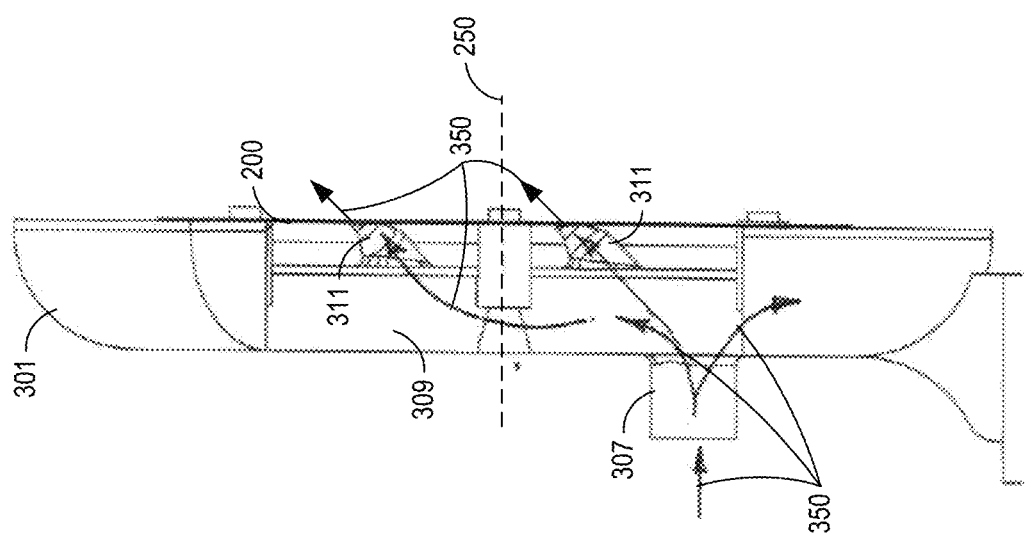
FIG. 3D illustrates a front view of the first side portion and ring saw blade of FIG. 3D.

As shown, for example, in FIG. 3A and the inner side view of the first side portion 301 of the housing of 300 of FIG. 3B, each fluid channel 309 is connected to a plurality of fluid nozzles 311 as mentioned above. The fluid nozzles 311 are configured to generate the fluid jets that support and drive the blade 200. In the illustrated embodiment of FIGS. 3A and 3B, each fluid channel 309 is connected to nine fluid nozzles 311. In other embodiments, other numbers of fluid nozzles 311 can be used. For example, FIGS. 3C and 3D illustrate an embodiment of the housing 300 that includes eight fluid nozzles 311 connected to each fluid channel 309.

Figure 3C:
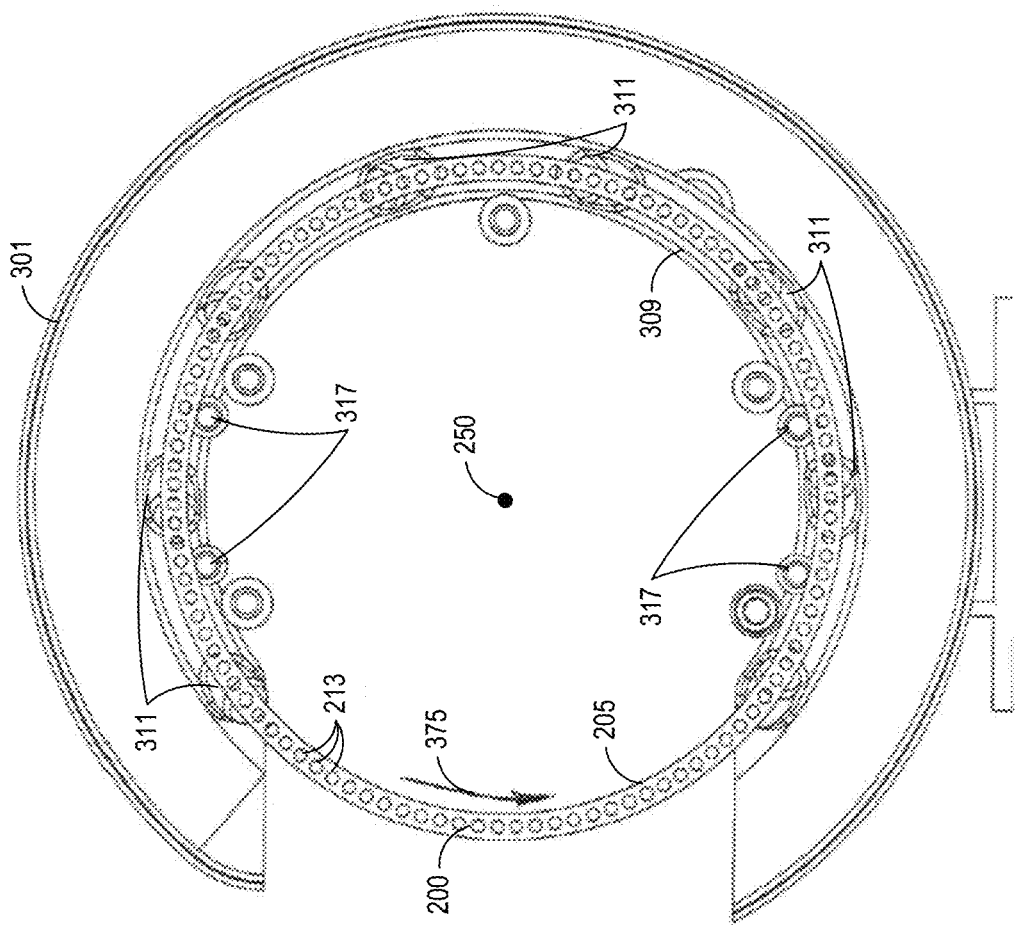
FIG. 3C is an inner side view of the first side portion of FIG. 3B with an embodiment of ring saw blade, illustrating the position of the ring saw blade relative to fluid nozzles of the housing.

The fluid nozzles 311 can be positioned around a diameter that substantially matches the diameter D on which the plurality of holes 213 of the blade 200 are positioned (see FIGS. 2C and 2D) so that the fluid nozzles 311 can be aligned with the plurality of holes 213 of the blade 200 during use as shown in FIG. 3C.

FIG. 3C is an inner side view of the first side portion 301 of the housing 300 illustrating the position of the blade 200 relative to fluid nozzles 311 of the housing 300. As shown, the blade 200 is positioned such that the fluid nozzles 311 are aligned with the holes 213 of the blade 200. This can allow fluid jets from the fluid nozzles 311 to engage and act upon the holes 213 to suspend and rotate the blade 200 around the axis of rotation 250 (extending into and out of the page in FIG. 3C) in the direction of rotation 375 as further described below.

As shown in FIGS. 3A-3D, the housing 300 can also include supports 317. As illustrated, the housing 300 can include four supports 317. In some embodiments, the housing may include one, two, three, five, six, or more supports 317 depending on desired support and/or contact during rest and operation. The supports 317 can be configured to support and position the blade 200 relative to the fluid nozzles 311. As best seen in FIG. 3C, the supports 317 can be positioned just inside the inner edge 205 of the blade 200. In some embodiments, the supports 317 contact the inner edge 205 of the blade 200 when the blade 200 is at rest. In some embodiments, the supports 317 can be positioned to contact the outer edge 205 and/or the inner edge 205. When the fluid-driven ring saw is activated, the fluid jets from the fluid nozzles 311 can lift the blade 200 off of the supports 317 such that the blade 200 spins freely. In some embodiments, the blade 200 may contact the supports 317 while spinning. In some embodiments, the blade 200 floats freely while spinning and does not contact any portion of the housing 300, including the supports 317. In some embodiments, the supports 317 can be separated from the blade 200 by a small distance to provide clearance between the blade 200 and the supports. In some embodiments, the small distance or clearance is about 0.1+/−0.095, including about 0.01+/−0.005 inches.

The C-shaped housing 300 illustrated in FIG. 3C, covers a large portion of the blade 200, such that the blade 200 is only exposed within the open end of the C-shape. In this embodiment, only this portion of the blade 200 (within the open end of the C-shape) is available for cutting.

FIG. 3D illustrates a front view of the first side portion 301 and the ring saw blade 200 and further illustrates fluid flow through the housing 300. FIG. 3D also illustrates the fluid flow 350 through the housing 300. As illustrated, fluid enters the housing 300 through the fluid inlet 307 and passes into the fluid channel 309. The fluid channel 309 distributes the fluid to the fluid nozzles 311. As shown, in some embodiments, the fluid exits the nozzles 311 at a general angle α (see FIG. 3E) with respect to the blade 200. The angle α can be about 45 degrees, although in other embodiments, the angle α can be greater or less than 45 degrees. A longitudinal axis along an extent of the nozzle 311 may extend substantially at the angle α discussed herein to generally direct the fluid at the angle α out of the nozzle 311 (see FIG. 3E). The angle α for each fluid nozzle 311 can be with respect to the direction of rotation 375 at the particular location of the fluid nozzle 311 along the circumferential or circular path of rotation of the blade 200. For example, FIG. 3B illustrates the fluid nozzles 311 change in orientation depending on the location along the arc of the rotational path of the blade 200 to be positioned and generally direct the fluid along the direction of rotation 375 along the circumferential rotation path of the blade 200 about the axis of rotation 250. The nozzles 311 can be pointed generally along the direction of rotation 375 at angle α with respect to the face of the blade 200 as discussed herein.

In some embodiments, the angle α is about 30 degrees, about 35 degrees, about 40 degrees, about 50 degrees, about 55 degrees, or about 60 degrees, including about 30 to about 60 degrees, about 35 to about 55 degrees, about 30 to about 50 degrees, including the foregoing values and ranges bordering therein. The angle α of the fluid jets exiting the fluid nozzles 311 can direct the fluid to impart the rotational motion to the blade 200. For example, as the fluid jets pass into and/or through the holes 213 of the blade 200, the fluid jets support and suspend the blade 200 and also impart rotational motion about the axis of rotation 250 due the angle α of the fluid jets with respect to the blade 200. A design balance between desired rotational motion and support of the blade 200 can be achieved. For example, the larger the angle of the nozzles 311, the faster the rotational speed that can be achieved, but which may result in less support to suspend the blade 200. Accordingly, relatively larger/heavier/thicker blades 200 as discussed herein can be designed with angled nozzles closer to 30 degrees. While relatively smaller/lighter/thinner blades can be designed with angled nozzles closer to 60 degrees. An angle α of 45 degrees of the nozzles 311 may achieve a desired result of balancing blade rotational speed with blade support.

Figure 3E:
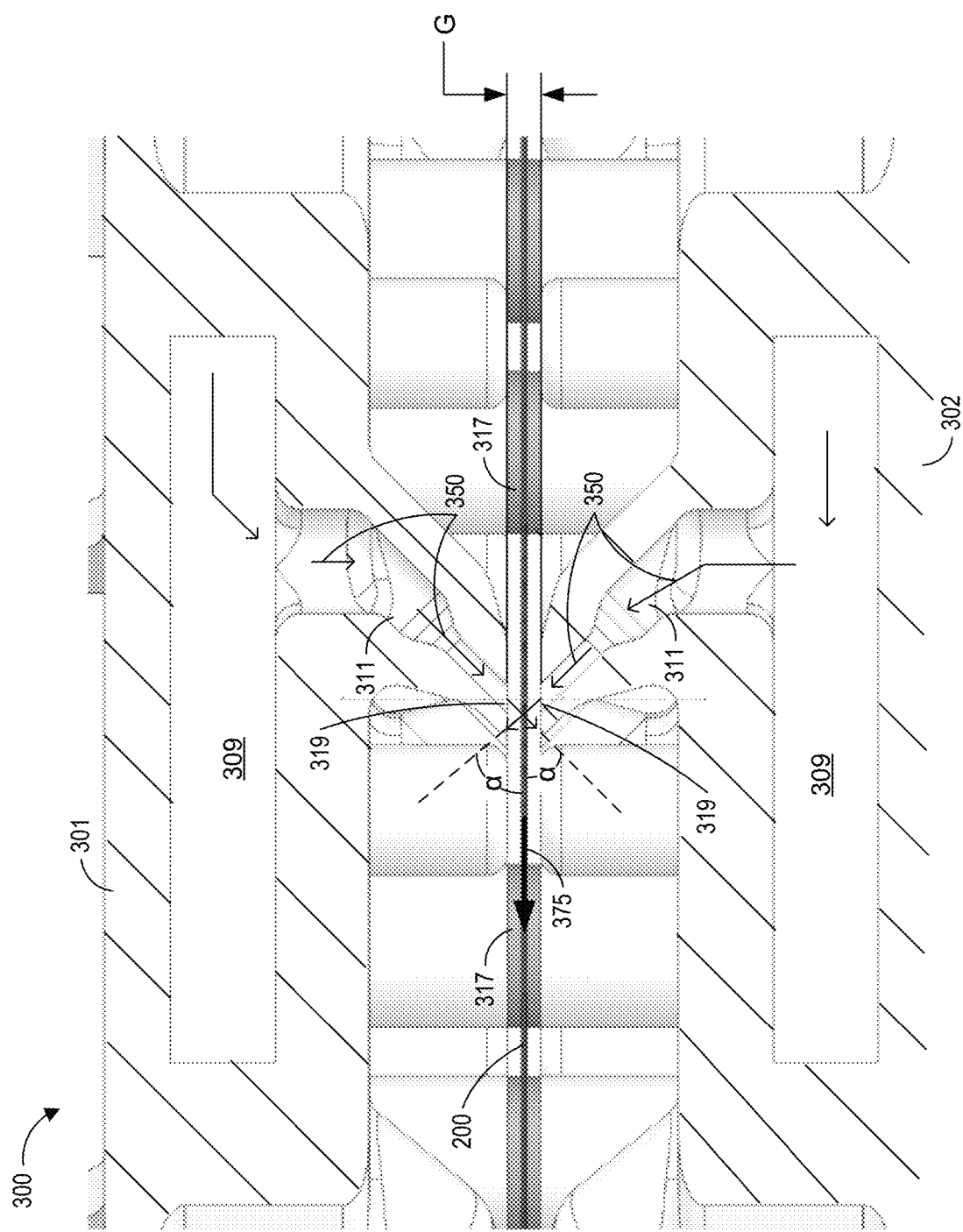
FIG. 3E is a cross-sectional view of the fluid-driven ring saw of FIG. 3A taken through an opposing pair of fluid nozzles.

As best seen in FIG. 3E, the fluid nozzles 311 of the first side portion 301 and the second side portion 302 are arranged in juxtaposed and opposing pairs. FIG. 3E is a cross-sectional view of the housing 300 and the blade 200 taken through an opposing pair of the fluid nozzles 311. As shown, the pairs of fluid nozzles 311 are separated by a gap, slot, space, or slit G. The blade 200 is positioned within the gap G between the fluid nozzles 311. In some embodiments, the gap G is about 150%, about 200%, about 250%, about 300% or about 350% the thickness T of the blade. In some embodiments, the gap G is about or less than 0.2 inches, about or less than 0.15 inches, about or less than 0.1 inches, about or less than 0.08 inches, about or less than 0.06 inches, about or less than 0.05 inches.

FIG. 3E also illustrates the fluid flow 350 through the fluid nozzles 311. In the illustrated embodiment, the pairs of juxtaposed fluid nozzles 311 are angled (e.g., at the angle α) in the direction of rotation 375, tangent to the arc of the blade 200 and in close proximity to each other. In some embodiments, the angle α is measured relative to a plane of the ring blade 200 (and/or in a plane tangent to the ring blade 200). For example, with respect to the orientation shown in FIG. 3E, the plane may extend parallel a face of the blade 200. The face of the blade 200 may extend substantially parallel to first peripheral side 207 and/or the second peripheral side 209 as discussed with respect to FIGS. 2A and 2B. With reference to FIG. 3E, the plane may extend substantially parallel to the lead lines indicating gap G. When the fluid is forced, pumped, or otherwise directed into the housing 300, it can escape through the fluid nozzles 311 in substantially equal force and quantity (e.g., substantially equal pressure) on both sides housing 300, forcing/causing the blade 200 to be centered in the gap G between the juxtaposed fluid nozzle 311 pairs. To suspend and drive the blade 200 with the fluid, the fluid jets can be generated by fluid nozzles 311 or other similar structures that are angled (for example, at a 45 degree angle) with respect to the radial plane and tangent to its center.

The fluid nozzles 311 are juxtaposed and facing in the same direction. The fluid nozzles 311 direct the fluid jets towards the centers of the holes 213 in the blade 200. During operation, these holes 213 surround the fluid jets as they escape the fluid nozzles. In order for the blade 200 to move out of position relative to the fluid nozzles 311, the blade must move so as to cut off the fluid flowing through the holes 213. So, if the blade 200 rises or falls the fluid is effectively cut off. It is resistance to this cutting off of the fluid that locks the blade 200 into place.

Further, the angle α of the fluid nozzles 311 and corresponding fluid jets causes the blade 200 to spin in the direction the fluid nozzles 311 are facing as the angled fluid impinges, contacts, and otherwise acts upon the holes 213 to impart greater forces and pressure on one circumferential side or surface of the holes 213 toward where the nozzle 311 is angled relative to the other circumferential side or surface from which the nozzle 311 is angled away from (e.g., sides or surfaces at the circumference or periphery of the hole 213). This causes rotation of the blade 200 around the rotational axis 250, allowing the next hole 213 to be aligned with the fluid nozzles 311. The two juxtaposed nozzles 311 produce opposing fluid jets that interact inside the hole 213 in the blade 200 making the blade 200 move forward thereby exposing the next hole to the same jets/nozzles 311. The fluid jets/nozzles 311 can provide uneven forces with respect to direction of rotation 375 (e.g., around the axis of rotation 250), which can cause the blade 200 to rotate as described above.

Additionally, in some embodiments, the fluid jets/nozzles 311 provide fluid that impinges, contacts, and otherwise acts upon the holes 213 to provide equal force against the holes 213 relative to an axis that is perpendicular to the axis of rotation in the plane of the blade 200 (e.g., equal forces against substantially or relative top and bottom sides or surfaces of the holes 213). This can allow the fluid from the jets/nozzles 311 to suspend and support the blade 200. The fluid nozzles 311 may be positioned to direct fluid to provide forces that are substantially equal in the plane of the face of the blade 200 along an axis that is substantially perpendicular to the axis of rotation 250. The fluid nozzles 311 may have a component of orientation with an angle of substantially 90 degrees relative to the plane of the face of the blade 200 along an axis that is substantially parallel to the axis of rotation 250. The fluid nozzles 311 may have a component of orientation that is substantially parallel or have an angle of zero along an axis that is substantially parallel to the axis of rotation 250.

As shown in FIG. 3E, the fluid nozzles 311 that produce the fluid jets are, in some embodiments, smooth and free from abrupt diametrical changes or sharp corners to produce a smooth fluid jet exiting the nozzles 311.

In some embodiments, the exit orifices 319 of the fluid nozzles 311 are smaller than the diameters of the holes 213, such as between about 40 to about 99%, about 60 to about 99%, about 80 to about 99%, or about 90 to about 99% of the diameter of the holes 213, including the foregoing values and ranges bordering therein. In some embodiments, the exit orifices 319 of the fluid nozzles 311 have the same size diameter as the holes 213. In some embodiments, the exit orifices 319 of the fluid nozzles 311 are larger than the diameters of the holes 213, such as between about 101 to about 160%, about 101 to about 140%, about 101 to about 120%, or about 101 to about 110% of the diameter of the holes 213, including the foregoing values and ranges bordering therein. In some embodiments, the exit orifices 319 have a diameter of about 0.035 inches, although other sizes for the exit orifices 319 are possible. In some embodiments, the exit orifices 319 are formed or molded with a first diameter, and then drilled out to a second, final diameter. For example, in some embodiments, the exit orifices 319 start at a diameter of 0.040, and then with shrinkage drilled to 0.035 inches.

Figure 4A:
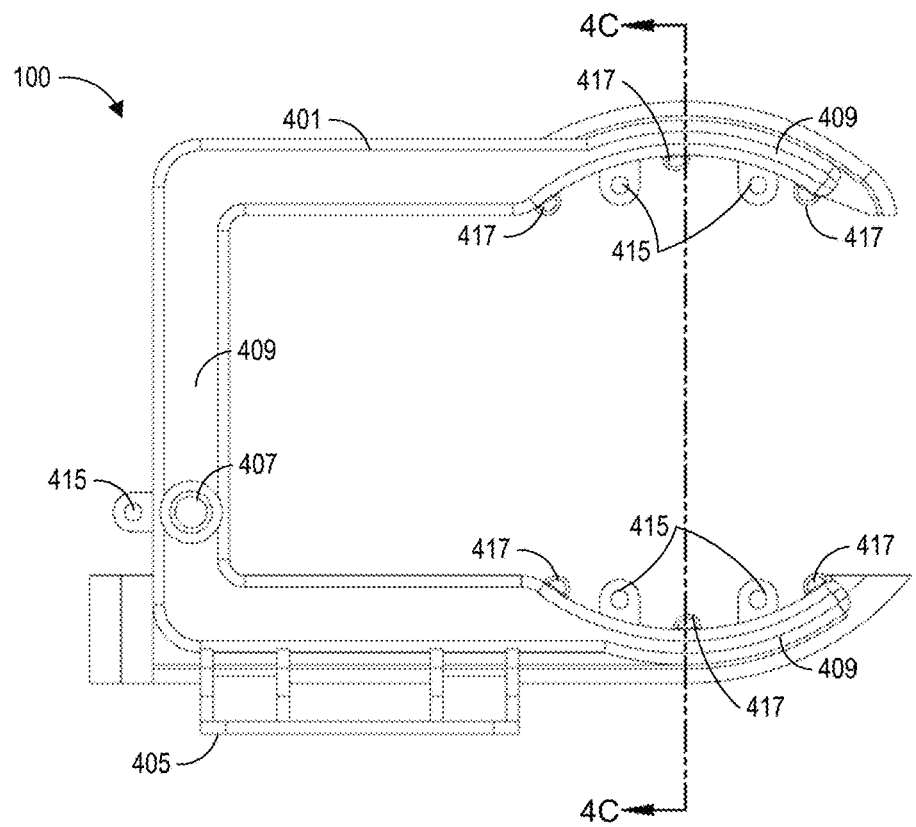
FIG. 4A illustrates an outer side view of a first side portion of another embodiment of a housing for a fluid-driven ring saw.
Figure 4B:
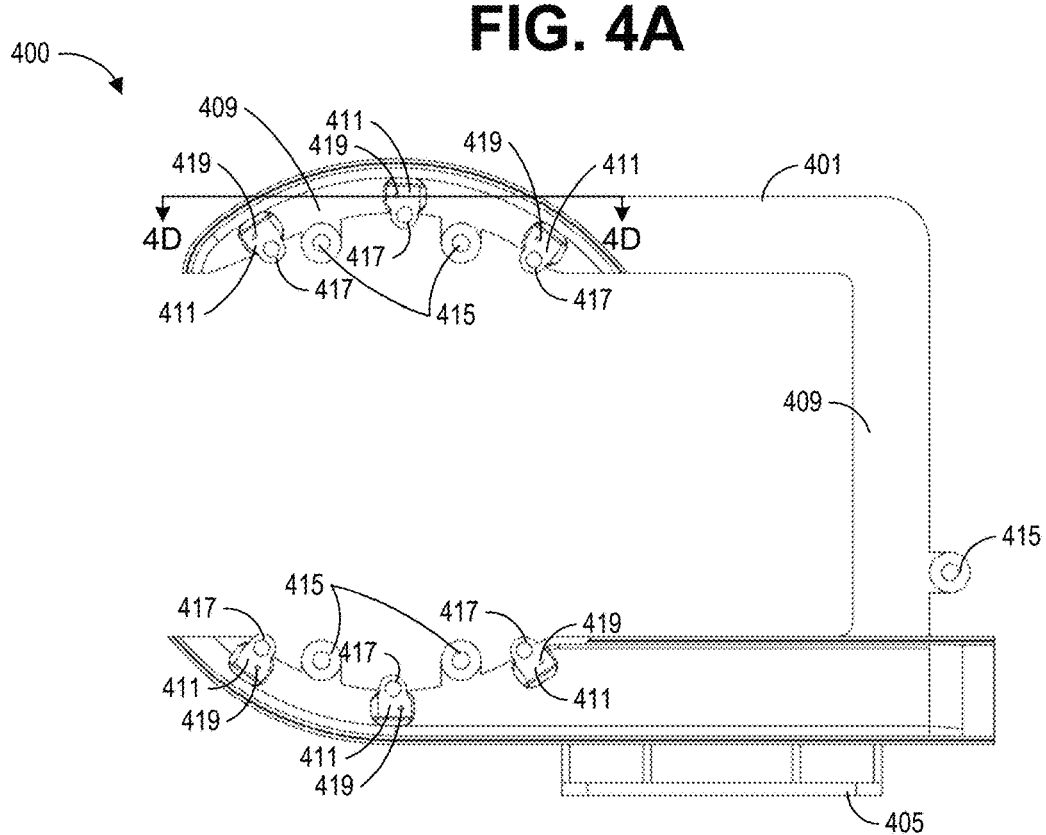
FIG. 4B illustrates an inner side view of the first side portion of FIG. 4A.
Figure 4D:
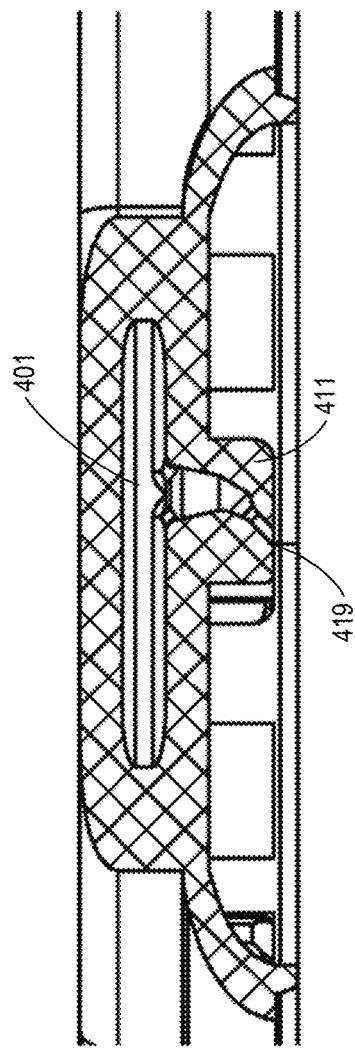
FIG. 4D illustrates a second cross-sectional view of the first side portion taken along the line shown in FIG. 4B.
Figure 4C:
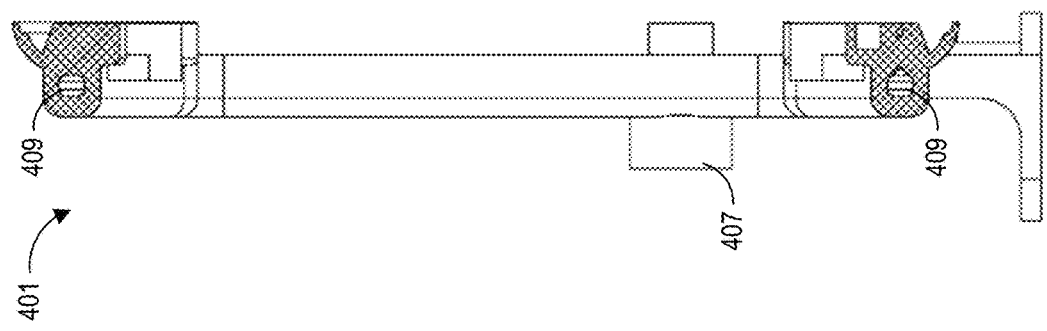
FIG. 4C illustrates a first cross-sectional view of the first side portion taken along the line shown in FIG. 4A.
Figure 4E:
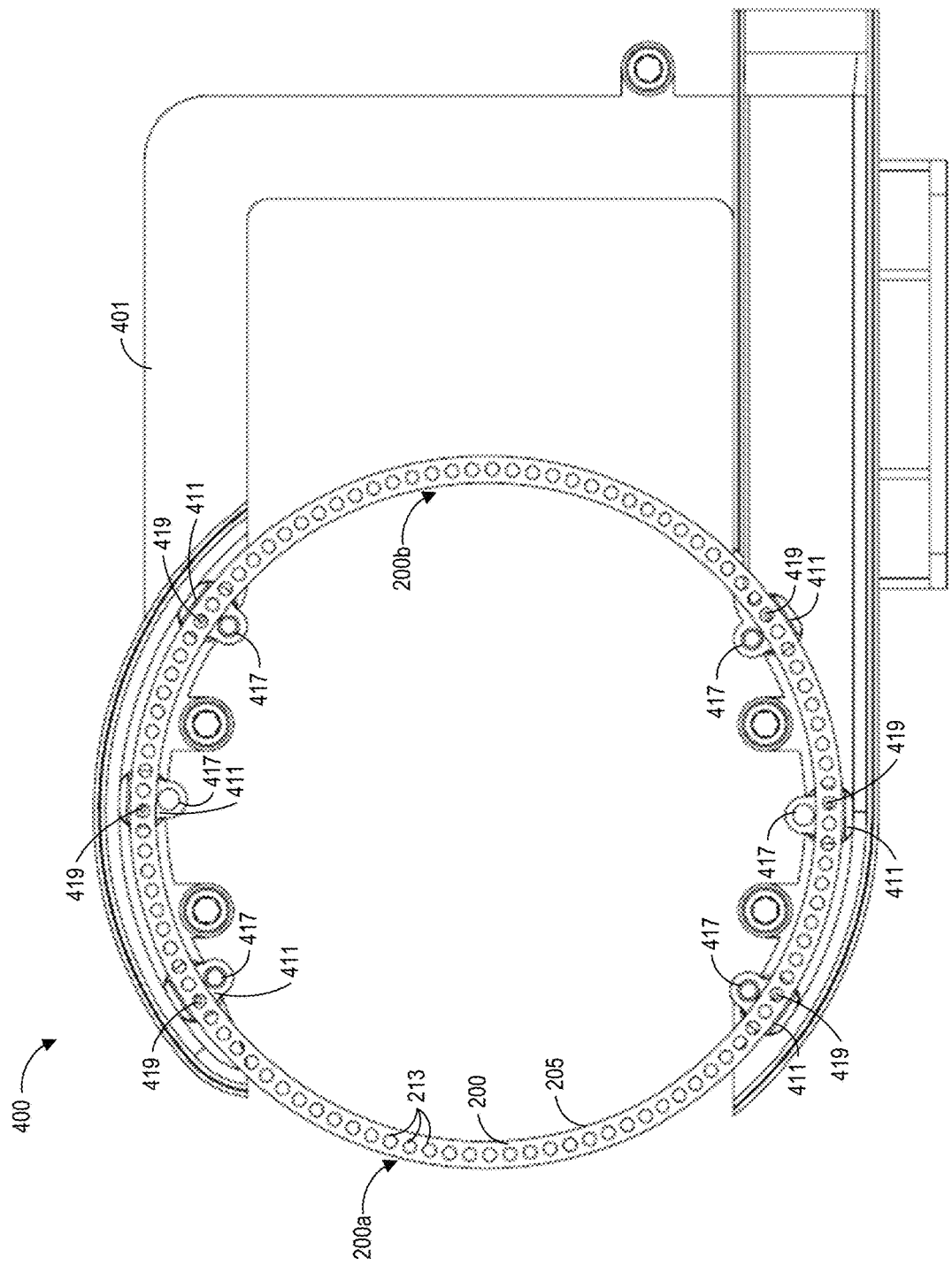
FIG. 4E is an inner side view of the first side portion of FIG. 4B with an embodiment of ring saw blade, illustrating the position of the ring saw blade relative to fluid nozzles of the housing.

FIGS. 4A-4E illustrate views of another embodiment of a housing 400 for a fluid-driven ring saw, for example, the fluid driven ring saw 100 shown above in FIGS. 1A-1C. FIG. 4A is an outer side view of a first side portion 401 of the housing 400. FIG. 4B is an inner side view of the first side portion 401 of the housing 400. FIG. 4C illustrates a first cross-sectional view of the first side portion 401 taken along the line shown in FIG. 4A. FIG. 4D illustrates a second cross-sectional view of the first side portion 401 taken along the line shown in FIG. 4B. FIG. 4E is an inner side view of the first side portion 401, illustrating the position of the ring saw blade 200 relative to fluid nozzles 411 of the housing 400.

The housing 400 may be similar to the housing 300 previously described. For example, the housing 400 includes first and second side portions that can be joined together to form the housing. Only the first side portion 401 is illustrated, but the second side portion can be a mirror image of the first side portion. The first and second side portions may include bolt holes 415 that allow the side portions to be joined together with mechanical fasteners, such as bolts. The housing 400 may include a bracket 405 for securing the housing 400 in position during use of the fluid-driven ring saw.

The housing 400 can include one or more fluid inlets 407 as shown in FIG. 4A. The fluid inlet 407 can be connected to fluid nozzles 411 (see FIGS. 4B, 4C, and 4E) by means of one or more fluid passages 409 (see FIG. 4C) that can be routed circumferentially about the housing 400. As best seen in FIGS. 4B and 4D, the fluid nozzles 411 include exit orifices 419 for producing fluid jets for driving and supporting the blade 200. FIG. 4E illustrates the relative position of the blade 200 relative to the fluid nozzles 411 and exit orifices 419. The housing 400 may include supports 417 for supporting the blade 200 relative to the fluid nozzles 411 when the device is not in used. In the illustrated embodiment, the supports 417 are positioned to contact the inner edge 205 of the blade 200. In some embodiments, the supports 417 can be positioned to contact the outer edge 203 and/or the inner edge 205 to provide additional support and orientation of the blade at rest and/or during operation while the blade 200 is suspended as discussed herein. The supports 417 at the outer edge 203 and/or the inner edge 205 can help position the blade 200 at rest for smoother and more consistent start of rotation from rest as well help the blade 200 in proper orientation during rotation of the blade 200. During rotation of the blade 200, the blade 200 may or may not contact the supports 417.

In the embodiment of FIGS. 4A-4E, the first side portion 401 includes six fluid nozzles 411, with three fluid nozzles 411 positioned on an upper portion of the first side portion 401 and three fluid nozzles 411 positioned on a lower portion of the first side portion 401. Other numbers of fluid nozzles 411 may be used in other embodiments. Similar to the housing 300, the fluid nozzles 411 of the housing 400 are arranged in angled (see FIG. 4D) and juxtaposed pairs as described above to support and drive rotation of the blade 200.

As best seen in FIG. 4E, the housing 400 may have an elongated C-shape, such that a front portion 200a and a back portion 200b of the blade 200 are exposed. This may allow a user to make cuts using either the front portion 200a or the back portion 200b of the blade 200 as desired.

In some embodiments, the housing 300, 400 of a fluid-driven ring saw can be 3D printed. This method of manufacture may be particularly well suited because the parts can be printed from the inside out, allowing for greater detail in the fluid nozzles and a fluid chambers where the fluid has no choice but to exit through the fluid nozzles themselves. Other suitable manufacturing process may be used.

In some embodiments, fluid driven ring saws can include an exhaust system for exhausting driving fluid and/or excess driving fluid exiting the nozzles 311. For example, in embodiments that include a housing, the housing 300, 400 can include exhaust ports that allow excess driving fluid to bleed out of the system. This can alleviate a problem that may occur due to excess fluid when the system is driven at higher speeds. The exhaust ports may be openings similar to nozzles 311, 411 discussed herein. The exhaust ports may be general openings or other spacing between portions of the housing 300, 400 that direct and/or allow flow of the fluid through ant out of the housing 300, 400.

Figure 5:
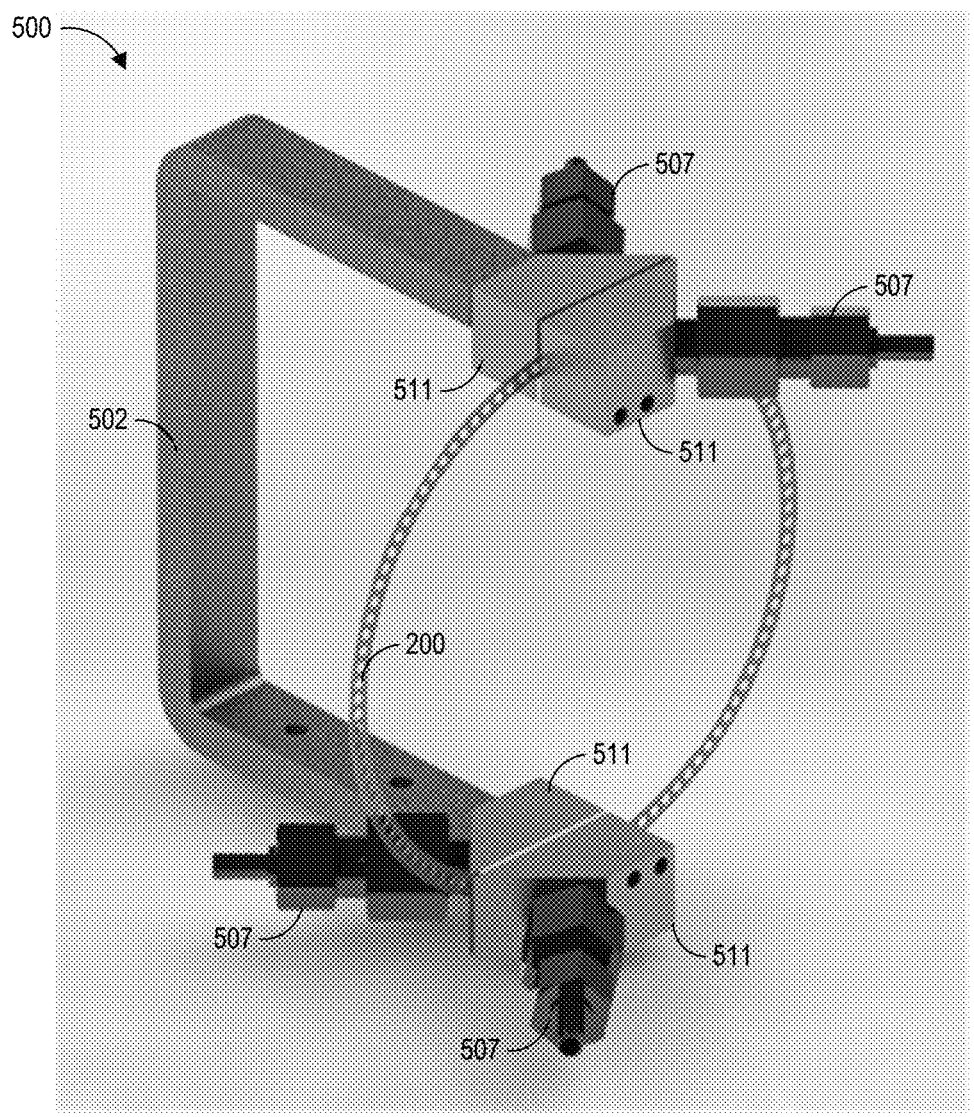
FIG. 5 is a perspective view of an embodiment of a fluid-driven ring saw.

FIG. 5 is a perspective view of another embodiment of a fluid-driven ring saw 500. This embodiment, includes a C-arm 502 that supports an upper pair of opposed and angled fluid nozzles 511 and a lower pair of opposed and angled fluid nozzles 511. Each fluid nozzle 511 includes a fluid inlet 507 that can be connected to a fluid source. This embodiment does not include a housing such that a large portion of the blade 200 is exposed. The fluid nozzles 511 may be considered to include housing sufficient, for example, to direct the fluid as discussed herein and provide supports 317, 417

In some embodiments, the fluid nozzles 311, 411, 511 should be constructed in such a manner that all edged are smooth as possible. This may allow for optimal air flow through to the blade 200 from the fluid source.

In some embodiments, the speed at which the blade 200 rotates at least partially determines how flat the blade 200 remains during rotation. For example, the thinner the blade 200, the flatter it will be when it spins, in some embodiments. Additionally, in some embodiments, the faster the blade 200 spins, the flatter the blade 200 will be. In some embodiments, the flatness of the blade 200 is what makes a straight cut possible. Flatness can be relative to the desired cutting plane of the blade 200.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps. Features of embodiments disclosed herein preceded by a term such as "generally", "approximately", "about", and "substantially" as used herein represent the feature with some variability that still performs a desired function or achieves a desired result for that feature.

The above description discloses several methods and materials of the present invention(s). This invention(s) is susceptible to modifications in the methods and materials, as well as alterations in the fabrication methods and equipment. Such modifications will become apparent to those skilled in the art from a consideration of this disclosure or practice of the invention(s) disclosed herein. Consequently, it is not intended that this invention(s) be limited to the specific embodiments disclosed herein, but that it cover all modifications and alternatives coming within the true scope and spirit of the invention(s) as embodied in the attached claims.

What is claimed is:

1. A fluid-driven ring saw comprising:
    a housing comprising one or more pairs of fluid nozzles, wherein each pair of fluid nozzles comprises a first fluid nozzle separated from an opposite second fluid nozzle by a gap; and
    a ring blade positioned within the gap, the ring blade comprising:
        an annular body having an outer edge, an inner edge, a first peripheral side, and a second peripheral side, and
        a plurality of holes positioned around the annular body, each hole extending through the annular body from the first peripheral side and the second peripheral side,
    wherein the one or more pairs of fluid nozzles are configured to deliver fluid jets that apply forces to surfaces of the plurality of holes of the ring blade to drive rotation of the ring blade.

2. The fluid-driven ring saw of claim 1, wherein the fluid-driven ring saw does not comprise a mechanical linkage for driving rotation of the ring blade.

3. The fluid-driven ring saw of claim 1, wherein the fluid jets delivered by the one or more pairs of fluid nozzles are further configured to support the ring blade during rotation of the ring blade such that the ring blade does not physically contact any component of the fluid-driven ring saw during rotation.

4. The fluid-driven ring saw of claim 1, wherein, for each of the one or more pairs of fluid nozzles, the first fluid nozzle and the second fluid nozzle are juxtaposed such that a fluid jet delivered by the first fluid nozzle applies forces on the plurality of holes of the ring blade from the first peripheral side and a fluid jet delivered by the second fluid nozzle applies forces the plurality of holes of the ring blade from the second peripheral side.

5. The fluid-driven ring saw of claim 4, wherein, for each of the one or more pairs of fluid nozzles:
    the first fluid nozzle comprises a first exit orifice;
    the second fluid nozzle comprises a second exit orifice; and
    the first and second exit orifices are aligned in a direction parallel to an axis of rotation of the ring blade.

6. The fluid-driven ring saw of claim 5, wherein, for each of the one or more pairs of fluid nozzles, the first and second fluid nozzles are positioned at an angle along a direction of rotation of the ring blade relative to a plane of the ring blade, the plane substantially perpendicular to the axis of rotation of the ring blade.

7. The fluid-driven ring saw of claim 6, wherein the angle is about 45 degrees.

8. The fluid-driven ring saw of claim 5, wherein, for each of the one or more pairs of fluid nozzles, the first and second fluid nozzles are configured to direct fluid to provide substantially equal forces against the surfaces of the plurality of holes along an axis substantially perpendicular to the axis of rotation of the ring blade.

9. The fluid-driven ring saw of claim 1, wherein a thickness of the ring blade is less than 0.02 inches.

10. The fluid-driven ring saw of claim 1, wherein a thickness of the ring blade is about 0.002 inches.

11. The fluid-driven ring saw of claim 1, wherein the fluid jets comprise air.

12. The fluid-driven ring saw of claim 1, wherein the one or more pairs of fluid nozzles are formed in a housing, and wherein the housing further comprises:
    a fluid inlet; and a fluid channel extending between the fluid inlet and the one or more pairs of fluid nozzles.

13. A saw blade that is configured to be driven by a fluid, the saw blade comprising:
    an body having an outer edge, an inner edge, a first peripheral side, and a second peripheral side, wherein a thickness of the saw blade, measured between the first peripheral side and the second peripheral side, is less than 0.02 inches; and
    a plurality of cutouts positioned around the body, each of the plurality of cutouts extending through the body from the first peripheral side and the second peripheral side, each of the plurality of cutouts comprising an annular opening formed on the first peripheral side and the second peripheral side and a cylindrical inner surface defining the each of the plurality of cutouts.

14. The saw blade of claim 13, wherein the thickness is less than 0.01 inches.

15. The saw blade of claim 13, wherein the thickness is less than 0.005 inches.

16. The saw blade of claim 13, wherein each of the cutouts comprise a uniform diameter.

17. The saw blade of claim 13, wherein the plurality of cutouts comprise a plurality of groups, and wherein each group comprises four cutouts that decrease in diameter from a first cutout of the group to a fourth cutout of the group, and wherein the groups repeat around the body.

18. The saw blade of claim 13, wherein the saw blade is configured to be driven by a fluid without being contacted by a mechanical drive linkage.

19. A method for driving rotation of a blade of a ring saw, the method comprising:
    directing fluid jets into a plurality cutouts on the blade of the saw to support and drive rotation of the blade without the use of a direct mechanical linkage connecting to the blade; and
    suspending the blade, while driving rotation of the blade, via the fluid jets being directed into the plurality of cutouts.

20. The method of claim 19, further comprising directing the fluid jets at angle relative to a direction of rotation of the blade to drive rotation of the blade.

21. The method of claim 19, further comprising directing the fluid jets to provide substantially equal forces on the cutouts substantially perpendicular to an axis of rotation of the blade in order to support the blade.

* * * * *